United States Patent

[11] 3,584,441

| [72] | Inventor | Walter E. Strimling<br>63 Westcliff Road, Weston, Mass. 02193 |
|---|---|---|
| [21] | Appl. No. | 697,088 |
| [22] | Filed | Jan. 11, 1968 |
| [45] | Patented | June 15, 1971 |

[54] GAS PURIFICATION APPARATUS
6 Claims, 7 Drawing Figs.

[52] U.S. Cl. .................................................. 55/162, 55/208
[51] Int. Cl. .............................................. B01d 53/04
[50] Field of Search ........................................ 55/20, 21, 33, 62, 162, 163, 179, 208

[56] References Cited
UNITED STATES PATENTS
| 3,430,418 | 3/1969 | Wagner .................... | 55/62 |
| 2,992,703 | 7/1961 | Vasan et al. ................ | 55/62 |
| 3,085,379 | 4/1963 | Kiyonaga et al. ............ | 55/62 |
| 3,343,916 | 9/1967 | Cahn et al. ................. | 55/62 |

OTHER REFERENCES
Anders Driline Publication #R-34. "On Guard Day and Night," 1959, (copy in class 55, subclass 62).

*Primary Examiner*—Reuben Friedman
*Assistant Examiner*—Charles N. Hart
*Attorney*—Herbert M. Shapiro

ABSTRACT: Gas purification apparatus including reactant tanks into opposite ends of which mainstream and purge gases are introduced in a reciprocal operation are equipped with a purge gas heating arrangement for increasing the efficiency of the purge operation and a depressurizing arrangement for reducing the breakdown of reactant granules in these tanks. A simple control circuit in which a timing portion is removable for replacement with a leak test control panel is also described.

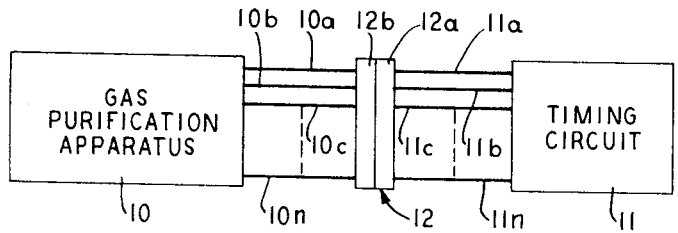
FIG. 1
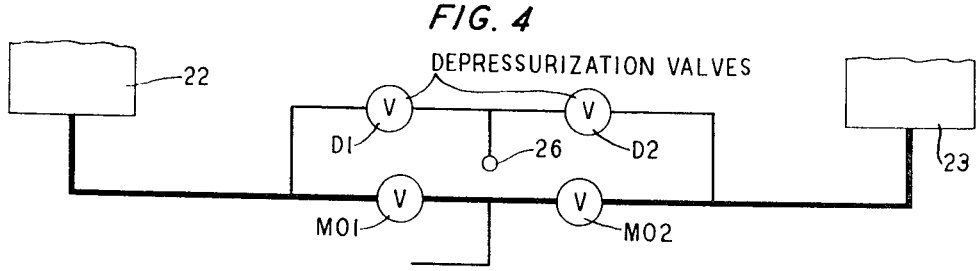
FIG. 4
FIG. 6
| OPERATION AND CONTROL | VALVE OR HEATER | TIMING t IN HOURS |
|---|---|---|
| | | 0 1 2 3 4 5 6 7 8 9 10 11 12 13 14 15 16 |
| A | MI2 & MO2 | ▨▨▨▨▨▨▨▨ (0–8) |
| B | D1 | ▨ (0–0.5) |
| C | 37-1 | ▨▨▨▨ (0–4) |
| E | HP1 | ▨▨▨▨ (0–4) |
| F | PD1 | ▨▨▨▨▨▨▨▨ (0–8) |
| G | CP1 | ▨▨▨▨ (4–8) |
| H | MI1 & MO1 | ▨▨▨▨▨▨▨▨ (8–16) |
| J | D2 | ▨ (8–8.5) |
| K | 37-2 | ▨▨▨▨ (8–12) |
| L | HP2 | ▨▨▨▨ (8–12) |
| N | PD2 | ▨▨▨▨▨▨▨▨ (8–16) |
| P | CP2 | ▨▨▨▨ (12–16) |
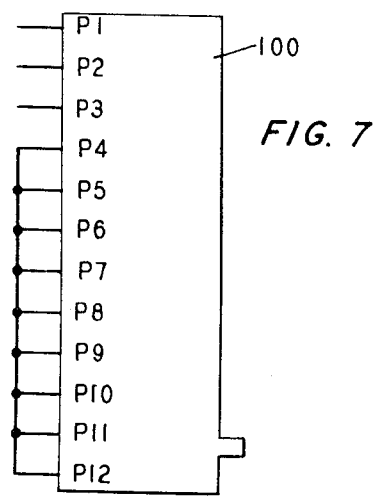
FIG. 7
INVENTOR
W. E. STRIMLING
BY
Herbert M. Shapiro
ATTORNEY INVENTOR
W. E. STRIMLING
BY
Herbert M. Shapiro

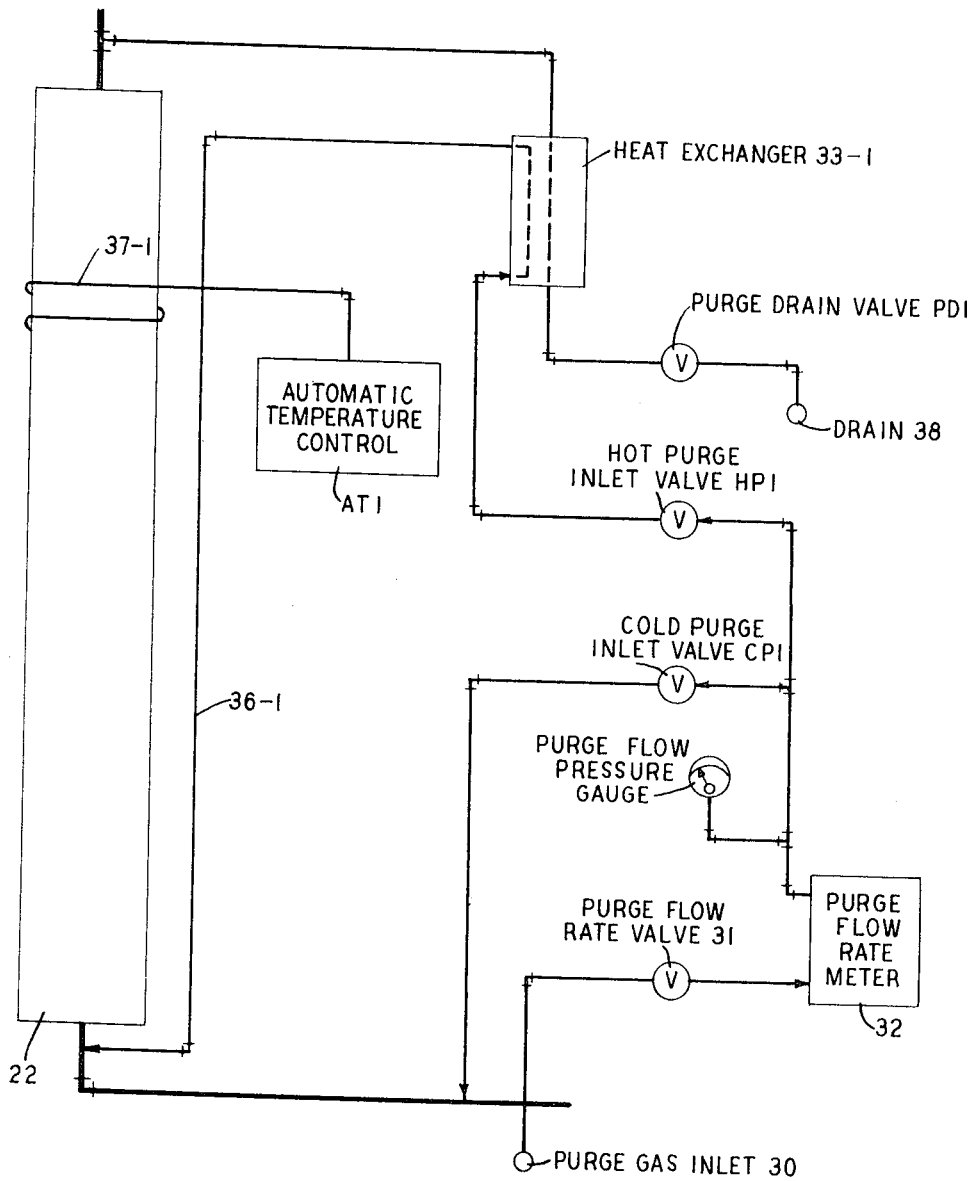

GAS PURIFICATION APPARATUS

FIELD OF THE INVENTION

The present invention relates to improvements in gas purification apparatus and is directed primarily at improvements in such apparatus and the operation thereof when one portion of the apparatus is taken off stream and another is placed on stream.

BACKGROUND OF THE INVENTION

Gas purification systems normally require redundant apparatus a first portion of which is "on-stream" purifying mainstream gases passed through the apparatus under pressure while a purge gas cleanses a second like portion of the apparatus of impurities removed from the mainstream gas during a previous "on-stream" cycle.

Such apparatus is commonly employed for removing impurities such as oxygen, water, and nitrogen from helium, for example, or for purifying nitrogen or noble gases for industrial processing purposes. Semiconductor processing, for example, requires pure ambient gases because even small impurity concentrations give rise to varying device characteristics at best and may even lead to device failures. Great effort is expended in providing a pure ambient, of course.

Each portion of the purification apparatus includes a sealed tank having input and output connections in the path of the mainstream gas being purified. The tank includes a reactant which removes impurities from the mainstream gas and which becomes contaminated in the process.

Typically, the reactants are in the form of granules each having a geometry determined by a compromise between a maximum surface area to volume ratio and a requirement for sufficient space to permit even passage of the mainstream gas. Such granules, then, are desirably small to increase the surface area to volume ratio yet sufficiently large to permit sufficient space to pass the mainstream gas. For each reactant a particular geometry provides optimum efficiency as is well known.

A typical gas purification system is arranged to introduce mainstream gas and purge gas into opposite ends of the reactant tanks. The mainstream gas is at a higher pressure than the purge gas typically 0.1 lb./sq. in. for the mainstream gas and 0.01 lb./sq. in. for the purge gas. Also a substantial pressure differential is created between tank inlet and outlet during an on-stream operation. Accordingly, it is advantageous to introduce the mainstream gas into the reactant tank at an end opposite to that toward which gravity urges the reactant granules. In this manner, the reactant granules are little disturbed by the mainstream gas flow and reactant granule breakdown is relatively low. The reactant is designed so that the mainstream gas is purified by a small fraction, say one-third of the reactant. The output of the reactant tank consequently is free of impurities. The purge gas, on the other hand, is introduced at the (mainstream gas) output end of the reactant tank. This avoids driving impurities into the output of the reactant tank. The relatively low pressure of the purge gas disturbs the reactant granules relatively little again reducing reactant-granule breakdown.

Unfortunately, granule geometry still changes in use resulting in a variety of undesirable consequences. One consequence is that the efficiency of the reactant diminishes relatively quickly requiring frequent replenishment and thus expensive down time. A corollary consequence is that the efficiency of the reactant varied during operation leading to an output gas having varying characteristics. This, in turn, leads to, for example, semiconductor devices having perhaps correspondingly varying characteristics. In addition, particles from the reactants are found in the output gas. Such particles lead to device failures and have necessitated filters in the output line in order to reduce the amount of such contaminants. Such measures, of course, are only stopgap measures. The reactant granules continually reduce in size, during operation, until they are below the size eliminated by such filters.

An object of this invention is to reduce reactant granule breakdown in the reactant tanks of redundant-type gas purification apparatus where main gas and purge gas are introduced at opposite ends of the reactant tanks.

The invention, in one of its aspects, is based on the realization that a substantial amount of reactant granule breakdown is caused by a movement of the granules occasioned by pressure changes in the reactant tank when an on-stream tank is taken off-stream and the tank most recently purged of contaminants is again placed on-stream.

Another object of this invention, then, is to control pressure changes in gas purification apparatus to reduce reactant granule geometry changes.

A further problem with gas purification apparatus relates to the purge operation of the contaminated reactant most recently taken off-stream. The reactants have been found to be reactivated nonuniformly, the reactants at the end removed from the input end of the purge gas being most fully activated. Consequently, reactant tanks are typically larger than need be for performing an assigned task.

A further object of this invention, accordingly, is to provide gas purification apparatus including means for reactivating substantially uniformly the reactants employed therein.

To this end, applicant has found that the nonuniformity in the reactant regeneration operation corresponds to the nonuniformity in purge gas temperature as that gas traverses the reactant tank. The prior art provides for a purge gas at a temperature relatively low when compared to the temperature at which reactant regeneration is most efficiently carried out. Further, available apparatus includes heating coils which encompass each reactant tank and function to heat the purge gas to the temperature at which the most efficient regeneration does occur. The purge gas, consequently, increases its temperature as it traverses the reactant tank resulting in the full regeneration of typically only the third of the reactant in the portion of the reactant tank most remote from the input of the purge gas. The remaining reactant is regenerated to a lesser degree corresponding to the lower temperatures of the purge gas at the corresponding positions in the tank.

Each of the like portions of the symmetrical gas purification apparatus includes not only the reactant tank but also a variety of heaters, conduits, and valves. Operation proceeds under the control of a timing circuit in response to signals from which the various elements are operated. Typically, the cycle time for gas purification apparatus is measured in the tens of hours at a time scale for which electronic controls are unsuited. Consequently, mechanical timing means are usually provided.

Consider the control of the valve operation. At various times in the operation, it is necessary to open some valves and close others. A plurality of cam trains are arranged to control switch closings at prescribed times. In turn, power is provided for operating the various valves which are conveniently solenoid valves to this end. However, often in manufacture the various cams are not set quite accurately and the valves do not operate in an entirely synchronous manner.

A further object of this invention is to provide a gas purification apparatus including control means for insuring operation of the various elements in a synchronous manner.

BRIEF DESCRIPTION OF THE INVENTION

The foregoing and further objects of this invention are realized in one embodiment thereof wherein the pressure built up in a reactant tank of a two-tank gas purifying system is relieved at the end of the tank to which the reactant granules are urged during on-stream operation in order to avoid the violent repositioning of those granules when that pressure is relieved from the other end of the tank. Further, cold purge gas is passed initially through a heat exchanger to elevate the purge gas to a temperature at which most efficient reactant regeneration occurs before the purge gas is introduced into the reactant tank. That temperature is maintained, by additional heating means, as the purge gas traverses the tank.

A cam arrangement controls the various elements in the apparatus. In accordance with one aspect of this invention, lockout techniques are employed to provide a combination electromechanical arrangement to insure substantial compliance with specified operation even if cams are misaligned.

In addition, the entire timing panel including the cams and the electromechanical arrangement is removable for permitting a programmed plug-in device to be substituted. The plug-in device is constructed to power all or selected valves simultaneously thus opening the valves for enabling convenient leak testing of the entire apparatus at once.

A feature of this invention is gas purifying apparatus including means for depressurizing the reactant tanks from the output end of those tanks.

A further feature of this invention is gas purifying apparatus including means for introducing purge gas into reactant tanks at a relatively high temperature and means for maintaining that gas at a temperature from which it deviates only negligibly as it traverses the tank.

BRIEF DESCRIPTION OF THE DRAWING

FIG. 1 is a block diagram representing gas purifying apparatus and timing circuitry in accordance with this invention;

FIGS. 4 and 5 are schematic illustrations of the portions of the gas purifying apparatus of FIG. 1;

FIG. 6 is a timing diagram of the operation of the circuit of FIG. 1; and

FIG. 7 is a schematic illustration of a test plug arrangement for the gas purifying apparatus of FIG. 1.

DETAILED DESCRIPTION

Figure 2:
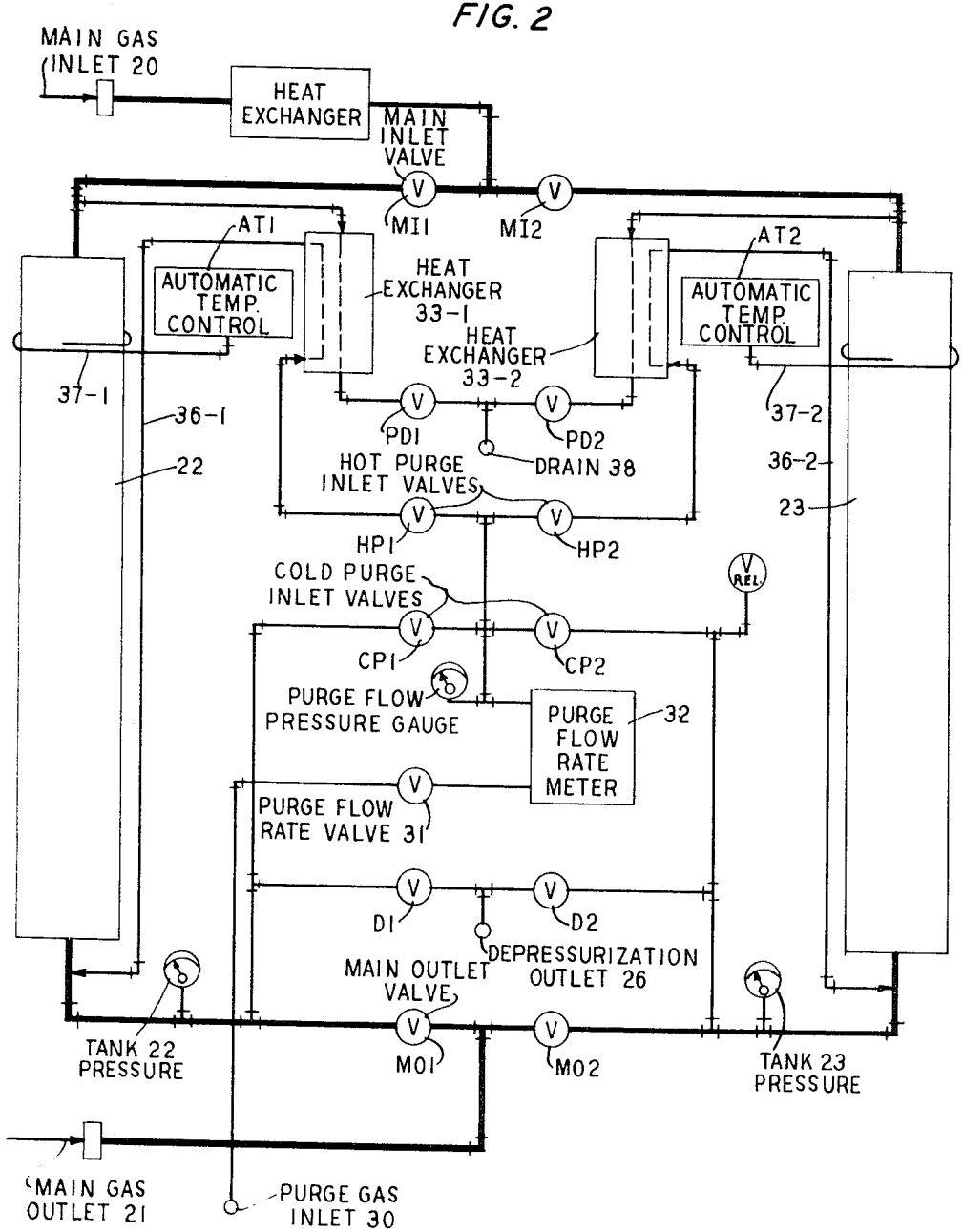
FIG. 2 is a diagram of the gas purifying apparatus of FIG. 1.

As has been stated, gas purification apparatus includes heaters and normally closed, solenoid-actuated valves which are operated under the supervision of a timing circuit. FIG. 1 represents the purification apparatus as a block 10 and the timing circuit as a block 11. Timing circuit 11 is connected to apparatus 10 by means of a standard plug-in connector represented by block 12 having a male portion 12a and female portion 12b. The various electrical conductors to the valves and heaters in the purification apparatus and to the elements of the timing circuit are represented by lines 10a, 10b, 10c, ...10n, and 11a, 11b, 11c, ...11n, respectively. We will have occasion to return to the interconnection of the purification apparatus and the timing circuit when we discuss the leak testing aspect of the present arrangement hereinafter.

The gas purification apparatus is shown in diagram form in FIG. 2. The apparatus comprises a mainstream gas inlet connection 20 and a mainstream gas outlet connection 21 between which first and second like conduit arrangements are provided. The conduit arrangements include first and second adsorber tanks 22 and 23, respectively. In the course of a purification cycle, gas flows from the inlet 20 to the outlet 21 along a path which includes, alternatively, first adsorber tank 22 and then adsorber tank 23. Only one-half of the conduits are employed at a time, the symmetrical other half being involved in a purge operation at that time. The alternative mainstream gas flow paths are shown by heavy lines in FIG. 2.

The particular path through which the gas proceeds is determined by the status of a variety of valves. Main inlet and outlet solenoid-activated valves MI1 and MO1, for example, are provided in the gas line to either side of adsorber tank 22. Similarly, inlet and outlet valves MI2 and MO2 are provided to either side of adsorber tank 23. If valve MI1 is opened and valve MI2 is closed, gas from a source, not shown, is introduced into adsorber tank 22.

Figure 3:
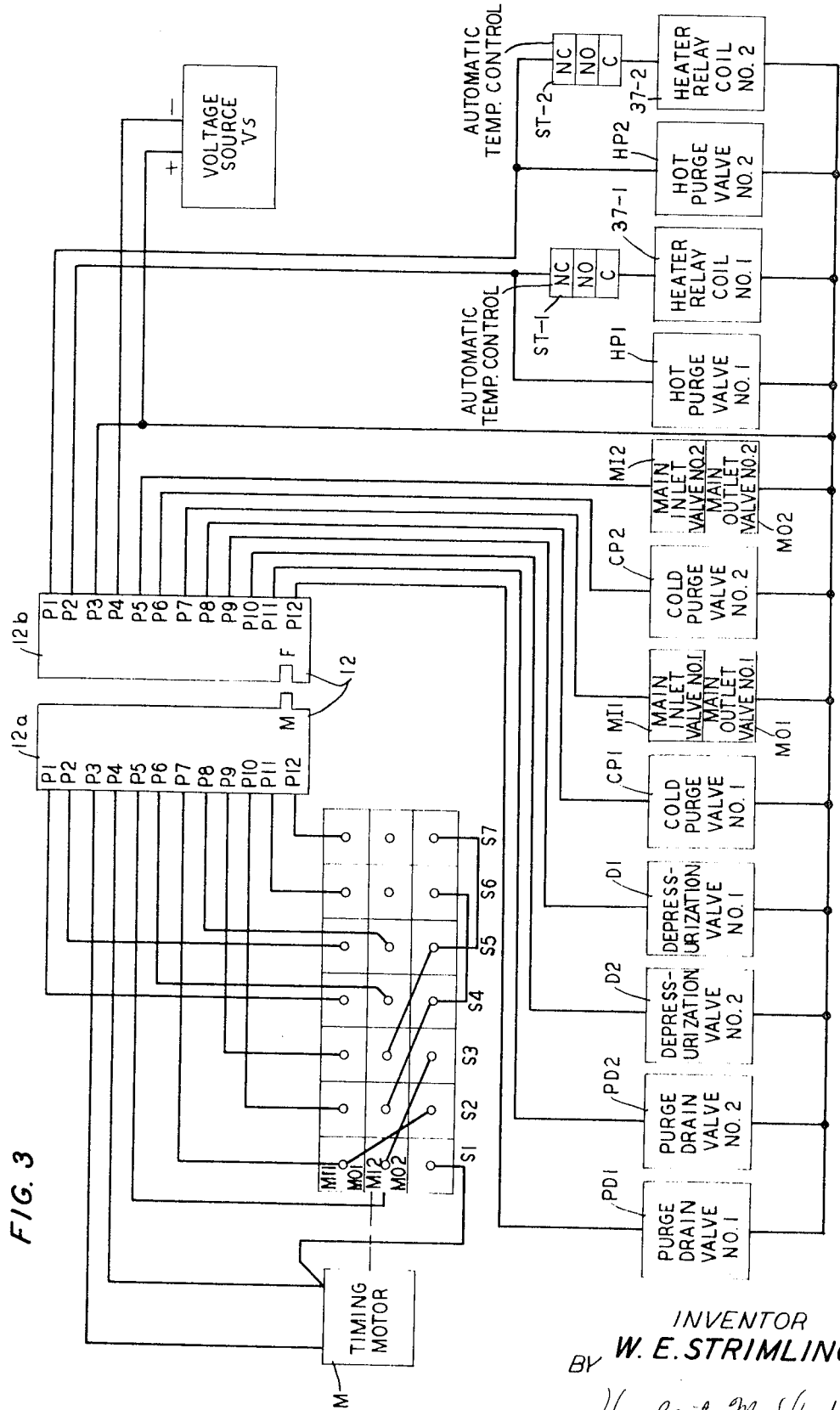
FIG. 3 is a schematic illustration of the timing circuit of FIG. 1.

The status of the various valves is determined by a control circuit comprising timing circuit 11 and solenoids and heaters in apparatus 10 as shown in FIG. 3. For this purpose, timing circuit 11 includes seven single pole, double throw switches labeled S1 through S7, in FIG. 3, for connecting negative power from a voltage source VS to activate the solenoids of the normally closed valves.

The timing circuit is divided from the operative elements at connector 12. The connector includes a plurality of pins P1 through P12 through which corresponding elements are powered when the two portions 12a and 12b of connector 12 are plugged together. A lead connects the negative terminal of source VS through pin P4 of the connector 12 to the armature of switch S1. The switch S1 has a normally open contact which is connected through pin P5 of connector 12 for actuating the solenoids for valves MI2 and MO2. The normally closed contact of switch S1 is connected through pin P7 for actuating solenoids MI1 and MO1. The solenoids have been given the same designations as the corresponding valves to avoid confusion.

By bringing power to the alternate pairs of main inlet and main outlet valve solenoids through a single pole, double throw switch S1, one of the adsorber tanks will always be on stream while the other will be off stream. In an apparatus where cycle times are measured in the many hours, it would be prohibitively expensive to provide a timing circuit which could switch one adsorber tank on stream and the other off stream within a few milliseconds of each other. Yet if both tanks were on stream and the output gas pressure would, inter alia, be increased while if the tanks were both off stream the output gas would be closed off.

When the adsorber tank is on stream, the pressure in the tank is the same as the input gas pressure. When the tank is taken off stream, that pressure is relieved. In accordance with one aspect of this invention, the output of tank 22, shown in FIG. 2, is connected via normally closed depressurization valve D1 to a depressurization outlet 26 to this end. Tank 23, of course, is similarly connected to outlet 26 via a depressurization valve D2.

The pressure relief apparatus is shown diagrammatically in FIG. 4. Only the output portions of tanks 22 and 23 are shown for providing a context for that apparatus. Again, the symmetry is observed, one-half the arrangement providing pressure relief for the corresponding reactant tank when that tank goes off-stream.

A normally closed contact of switch S3, see FIG. 3, is connected through pin P9 of the connector 12 to the solenoid of depressurization valve D1. Negative voltage is brought to the armature of switch S3 through the normally open contact of switch S1. It will be recalled that the normally open contact of switch S1 actuates main inlet valve MI2 and main outlet valve MO2. Therefore, the depressurization valve D1 cannot be energized until the main inlet valve MI2 is opened. Consequently, main inlet valve MI1 must be closed if valve D1 were opened. If main inlet valve MI1 were open when valve D1 was energized, main line gas would be expended through valve D1 wasting gas and dropping the pressure of the output gas. In a like manner, depressurization valve D2 is energized through the normally closed contact of switch S1 connected to the armature of switch S2. The normally closed contact of switch S2 is connected via pin P10 of connector 12 to solenoid D2.

A motor M turns the cams for operating the various switches. The motor is shown in FIG. 3 connected between pins 3 and 4.

The depressurization arrangement can be seen to be operative to depressurize an on-stream tank as it comes off stream. A depressurizing valve has a relatively small orifice to permit only a relatively slow depressurization rate, and the depressurization is from the output end of the tank to which reactant granules are urged during the on-stream cycle. Reactant granule movement, the explosive release of mainstream gas from reactant granules, and thus granule breakdown is minimized.

When an adsorber tank is taken off stream it undergoes a purge operation. The purge arrangement too, includes symmetrical alternative conduits, valves, and heaters to purge the corresponding off-stream tank. Only half of the alternative elements therein are described fully and the arrangement thereof is shown in FIG. 5. Specifically, purge gas inlet 30, to which a purge gas tank, not shown, is connected, connects via a purge flow rate valve 31, a purge flow rate meter 32, and a cold purge inlet valve CP1 to the outlet of adsorber tank 22.

In accordance with another aspect of this invention, each portion of the purge arrangement associated with one adsorber tank includes separate conduit arrangements for hot and cold purge gases. Specifically, the additional hot purge arrangement includes purge flow rate valve 31 and purge flow rate meter 32. The output of flow meter 32, however, also is connected via a hot purge inlet valve HP1 to the input of a heat exchanger 33-1. The output of heat exchanger 33-1 is connected to the output of adsorber tank 22 via a conduit 36-1. The flow rate is determined by a manual adjustment on valve 31 in accordance with purge flow rate meter 32, the calibration of which is monitored by an unnumbered purge flow pressure gauge.

The conduit 36-1 is arranged in close proximity to heating coils illustratively encompassing tank 22. The heating coils are represented by a coil symbol 37-1 connected to an automatic temperature control AT1 and are intended primarily to heat the purge gas to maintain it at a suitable purge reaction temperature. The input of tank 22, in turn, is connected to an input of heat exchanger 33-1. An output of heat exchanger 33-1 is connected to a purge drain valve PD1 and to a drain 38.

In operation, purge gas is heated by heater 37-1 before it enters tank 22, is heated continually as it traverses tank 22, and passes any heat retained thereby to incoming purge gas as it leaves the mainstream gas input end of tank 22. Thus, purge gas is preheated to a prescribed reaction temperature before entering tank 22 and is maintained at that prescribed temperature as it traverses the tank. Moreover, the arrangement is particularly efficient because unused heat is passed from purge gas leaving tank 22 to purge gas entering tank 22 via heat exchanger 33.

The hot purge operation is followed by a cold purge operation which introduces cold purge gas into the output end of tank 22 at a prescribed flow rate regulated by a purge flow rate meter 32 in FIG. 2. The cold purge gas reduces the temperature of the reactant in tank 22 to a suitable temperature for immediate on-stream operation. Each of the valves and heaters shown in FIG. 5 is actuated by negative power being switched by ones of switches S1 through S7 and transmitted through the connector 12 in a manner similar to that described above in connection with the removal of an adsorber tank from an on-stream status.

The various valves and heaters associated with the purge operation should not be actuated unless the adsorber tank is off stream and the depressurization valve associated therewith is closed. Therefore, negative power is supplied to the armatures of switches S5 and S7 to actuate the purge of the absorber tank 22 from the normally open contact of switch S3 which controls the associated depressurization valve. In a like manner, negative power is supplied to the armature of switches S4 and S6 through the normally open contact of switch S2.

The cold purge valve CP1 for adsorber tank 22 is actuated through the normally open contact of switch S5 through pin P8. The hot purge valve HP1 and a heater relay coil 37-1, shown in FIG. 3 for adsorber tank 22, are actuated through the normally closed contact of the same switch S5 and pin P2. In this way, it is assured that only one of the purge valves will be opened at one time. If both valves CP1 and HP1 were to open together, the purge gas flow rate would be excessive. The gas, in addition, would be neither hot nor cold but rather would be at some inbetween temperature at which neither the hot nor the cold purge operation would be carried out efficiently. It should be noted that a thermostatic switch ST-1 is in series with the heater relay coil 37-1 to act as an automatic temperature control. Switch S4 with the pins P1 and P6 actuate the hot and cold purge valves CP2 and HP2 and the heater relay coil 37-2 for tank 23. A thermostatic switch ST-2 is included in series with the heater relay coil 37-2.

The elements associated with tank 23 include alphabetic or numerical designations as do the corresponding elements associated with tank 22 followed by the numeral "2" rather than the numeral "1" to correspond to the (second) adsorber tank 23. The various valves, controls, meters, and other elements may be any such elements capable of operating in accordance with this invention.

We will now describe a typical gas purification cycle with attention being directed to the juncture in the operation when one adsorber tank is taken off stream and the other is placed on stream.

A simple method for describing an illustrative cycle of operation is to describe the opening and closing of valves and the activation of heaters in accordance with a timing sequence. Accordingly, the description is rendered in terms of such a timing sequence in connection with a chart thereof shown in FIG. 6.

Let us assume, arbitrarily, that tank 22 is on-stream and we are about to change over to tank 23. We also assume a realistic 16 hour operating cycle and the horizontal axis of FIG. 6 is, accordingly, designated in hours and marked from 1—16. The consecutive operations are listed in FIG. 6 from top to bottom as viewed.

The first operation "A" indicates that the main inlet and outlet valves MI2 and MO2 associated with tank 23 are opened at time $t0$ ($t=0$) and remain open for 8 hours permitting mainstream gas into reactant tank 23 under pressure from the input gas tank. The open or active period for the elements identified in the column of FIG. 6, designated "Valve or Heater," is indicated by the corresponding horizontal bar in the timing column of that figure. All valves not explicitly stated to be open in connection with FIG. 6 are closed. Accordingly, main valves MI1 and MO1 are closed at time $t0$.

The second operation relates to the depressurizations of tank 22 now just taken off stream. To this end, depressurization valve D1 is open for about one-half hour as indicated by the bar corresponding to operation "B" in FIG. 6. The on-stream pressure in tank 22 is now relieved from the output end of the tank and the reactant granules in the tank have gone through the depressurization operation.

Heater 37-1 is now activated and remains activated for 3½ hours until time $t4$ as indicated by the bar in FIG. 6 corresponding to operation "C." Simultaneously, hot purge valve HP1 is opened. Valve HP1 remains open as long as heater 37-1 is on as indicated by the bar in FIG. 6 corresponding to operation "E."

The purge gas is heated by heater 37-1 before it enters tank 22. The gas also is continuously heated by heater 37-1 as it traverses tank 22. Further, the hot purge gas passes through heat exchanger 33-1 to heat cold purge gas along with heater 37-1 to a temperature from which that gas varies negligibly as it traverses tank 22.

When heater 37-1 and valve HP1 are activated, purge drain valve PD1 is opened also to permit purge gas to exhaust. Valve PD1 remains open for about 7 hours, several hours after heater 37-1 and valve HP1 are deactivated (and closed, respectively). This operation is indicated by the bar corresponding to operation "F" in FIG. 6.

When heater 37-1 and valve HP1 are deactivated, however, cold purge inlet valve CP1 is opened. This operation is designated "G" in FIG. 6. Valve CP1 remains opened for about one-half hour after valve PD1 closes (to build up pressure) as is indicated by the bar corresponding to operation "G" in FIG. 6.

One-half the operating cycle is now complete. Valves MI2 and MO2 are now closed and valves MI1 and MO1 are opened. A comparison between the bars corresponding to operations A and H indicates the appropriate timing. Valves MI1 and MO1 remain open for 8 hours. Tank 22 is now back on stream and tank 23 is to be purified of impurities accumulated during the next preceding half cycle.

The depressurizing valve D2 associated with tank 23 is next opened as indicated by the bar associated with operation J as shown in FIG. 6. Depressurization proceeds as discussed above in operation B.

The heating coils, here designated 37-2 are now activated. The coils are associated with tank 23 for heating purge gas passing therethrough. Simultaneously, hot purge valve HP2 and purge drain valve PD2 are opened. The timing for those operations is indicated by the bars corresponding to operations K, L and N in FIG. 6. As was the case in operations C and E, operations K and L terminate after about four hours at a time designated time $t12$. Operation N continues for another 3½ hours as did operation F.

The full operating cycle terminates with a cold purge of tank 23 as indicated in operation P as shown in FIG. 6. The corresponding bar indicates that valve CP2 is opened when heater 37-2 is deactivated and valve HP2 is closed. Valve CP2 remains open for about a half hour after valve PD2 is closed.

An illustrative operation is now complete.

Before operating a gas purification system, however, it is advisable to leak test it. One common leak testing procedure involves pressurizing the system to 150 p.s.i. of helium and sealing the system. After 24 hours, if the pressure in the system is within prescribed limits, it is assumed that no leaks exist. In the past, one could pressurize a system after sealing all but one opening by applying the gas under pressure to that opening. The system was then run at an accelerated rate, typically of a few minutes, through a few cycles of operation so that gas could reach all the conduits in the system. When the system is checked in this manner, one cannot be sure that no leaks exist therein. For example, if a small conduit has a large hole in it, all the gas would leak out but the gas pressure in the entire system would not drop and the hole might escape detection.

This problem is solved, in accordance with this invention, by arranging for the timing circuit 11 to be separate from the remainder of the control circuit at connector 12. An adapter card 100, shown in FIG. 7, acts to open all the valves. Card 100 is substituted for the timing circuit 11 during a leak test operation. All the pins in the connector 12 on adapter card 100 are tied together except pins P1, P2, and pin P3. Therefore, negative power coming in on pin P4 is applied to all the remaining pins opening all the valves. Pins P1 and P2 going to the heaters 37-1 and 37-2 are not connected and so the heaters are not powered during the leak test. Also, pin P3 which connects the positive potential to the timing circuit motor M is not connected. If the heaters were activated during the test, the pressure would rise possibly to explosive levels.

What has been described is considered only illustrative of the principles of this invention. Consequently, various other embodiments may be devised by one skilled in the art within the spirit and scope thereof.

I claim:

1. A gas purification arrangement including a reactant tank having first and second ends, mainstream gas inlet and outlet conduits connected to said first and second ends and including inlet and outlet valves, respectively, a conduit connected to said second end to provide a drain, said last-mentioned conduit including a depressurization valve, and a control circuit including means for closing said inlet and outlet valves, and means enabled by the closure of said inlet and outlet valves for opening said depressurization valve, said arrangement also including a purge gas conduit arrangement connected between a purge gas inlet and said second end, a purge drain conduit connected to said first end, said purge drain conduit including a heat exchanger and a purge drain valve, said purge gas conduit arrangement comprising first and second paths, said first path including a first purge valve said heat exchanger said tank said heat exchanger and said purge drain valve and being arranged in heat-exchanging proximity with a heating coil for heating said tank, said second path including a second purge valve said tank said heat exchanger and said purge drain valve and being arranged spaced apart from said heating coil, means for placing said first and second purge valves in opposite states, wherein said control circuit comprises means enabled by the closure of said inlet and outlet valves for opening said purge drain valve and for activating said heating coil, and means operative with the opening of said second purge valve for deactivating said heating coil.

2. An arrangement in accordance with claim 1, also including a timing circuit for supplying power to said control circuit in accordance with a timing sequence, said timing circuit being removably connected to said valves and heating means.

3. An arrangement in accordance with claim 2, in combination with a test circuit for supplying power to open selected ones of said valves simultaneously, said test circuit being removably connected to said control circuit.

4. First and second gas purification arrangements in accordance with claim 1 connected between said inlet and outlet connections, said first and second arrangements including first and second reactant tanks and associated first and second inlet and outlet valve pairs respectively, said control circuit including means enabled by the closing of the valves of one of said valve pairs for opening the valves of the other pair and means enabled by the closure of the valves of said one of said valve pairs for opening the associated third valve.

5. First and second gas purification arrangements in accordance with claim 1 wherein said control circuit includes means responsive to the closure of the inlet and outlet valves associated with the reactant tank of said first gas purification arrangement for enabling the opening of the inlet and outlet valves associated with the reactant tank of said second gas purification arrangement.

6. First and second gas purification arrangements in accordance with claim 1 also including a timing circuit for supplying power to said control circuit in accordance with a timing sequence, said timing circuit being removably connected thereto.